(12) United States Patent
Kim et al.

(10) Patent No.: US 10,054,837 B2
(45) Date of Patent: Aug. 21, 2018

(54) ELECTRO-OPTICAL DEVICE AND WEARABLE ELECTRONIC DEVICE

(71) Applicant: SAMSUNG DISPLAY CO., LTD., Yongin-si, Gyeonggi-do (KR)

(72) Inventors: Mugyeom Kim, Hwaseong-si (KR); Anna Ryu, Hwaseong-si (KR); Hee Soo Yoo, Seoul (KR); Kwanghoon Lee, Anyang-si (KR); Myounjin Lee, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 14/842,735

(22) Filed: Sep. 1, 2015

(65) Prior Publication Data
US 2016/0170283 A1 Jun. 16, 2016

(30) Foreign Application Priority Data

Dec. 12, 2014 (KR) .................. 10-2014-0179575

(51) Int. Cl.
*G02B 13/16* (2006.01)
*H04N 5/225* (2006.01)
(Continued)

(52) U.S. Cl.
CPC .............. *G02F 1/19* (2013.01); *G02B 26/08* (2013.01); *G02B 27/0093* (2013.01); *G02B 27/0172* (2013.01); *G02B 27/0176* (2013.01); *G02B 27/283* (2013.01); *G02F 1/0018* (2013.01); *G03B 17/17* (2013.01); *G03B 17/54* (2013.01); *H04N 5/2254* (2013.01); *H04N 5/23206* (2013.01); *H04N 5/23245* (2013.01); *H04N 5/23293* (2013.01); *G02B 5/04* (2013.01);
(Continued)

(58) Field of Classification Search
None
See application file for complete search history.

(56) References Cited

U.S. PATENT DOCUMENTS 6,307,526 B1 10/2001 Mann
6,384,982 B1 5/2002 Spitzer
(Continued)

FOREIGN PATENT DOCUMENTS

EP    1 793 271 A1    6/2007
JP    2012-159681 A   8/2012
KR    10-2014-0036351 A   3/2014

OTHER PUBLICATIONS

EPO Search Report dated Apr. 26, 2016, for corresponding European Patent application 15194474.1, (9 pages).
(Continued)

Primary Examiner — Stephen Coleman
(74) Attorney, Agent, or Firm — Lewis Roca Rothgerber Christie LLP

(57) ABSTRACT

An electro-optical device includes: an optical module including a switchable mirror layer configured to operate in a mode selected from a transmissive mode and a reflective mode; a display module configured to generate data images; and a camera module configured to obtain external images, wherein the switchable mirror layer is configured to provide the data images to different directions from each other to correspond to the transmissive mode and the reflective mode.

21 Claims, 17 Drawing Sheets

(51) Int. Cl.
  *G02F 1/19* (2006.01)
  *G02B 26/08* (2006.01)
  *G02B 27/28* (2006.01)
  *G03B 17/54* (2006.01)
  *G02B 27/00* (2006.01)
  *G02F 1/00* (2006.01)
  *H04N 5/232* (2006.01)
  *G03B 17/17* (2006.01)
  *G02B 5/04* (2006.01)
  *G02B 27/14* (2006.01)
  *G02B 27/01* (2006.01)

(52) U.S. Cl.
  CPC ...... *G02B 27/14* (2013.01); *G02B 2027/0138* (2013.01); *G02B 2027/0154* (2013.01); *G02B 2027/0169* (2013.01); *G02B 2027/0187* (2013.01)

(56) References Cited

U.S. PATENT DOCUMENTS

| | | | |
|---|---|---|---|
| 6,762,871 B2 | 7/2004 | Yoshimura | |
| 7,719,749 B1 | 5/2010 | Minor et al. | |
| 7,755,829 B2 | 7/2010 | Powers et al. | |
| 8,432,600 B2 | 4/2013 | Brown et al. | |
| 2005/0254130 A1 | 11/2005 | Graf et al. | |
| 2010/0020185 A1* | 1/2010 | Sako | H04N 5/247 348/211.1 |
| 2010/0277803 A1 | 11/2010 | Pockett et al. | |
| 2012/0050144 A1 | 3/2012 | Morlock | |
| 2012/0113209 A1 | 5/2012 | Ritchey et al. | |
| 2012/0320157 A1 | 12/2012 | Junuzovic et al. | |
| 2013/0100332 A1 | 4/2013 | Kim et al. | |
| 2013/0286264 A1 | 10/2013 | Kamikura et al. | |
| 2014/0028968 A1 | 1/2014 | Olsson et al. | |
| 2014/0055624 A1* | 2/2014 | Gaines | H04N 5/2254 348/207.1 |
| 2014/0125789 A1 | 5/2014 | Bond et al. | |
| 2015/0177864 A1* | 6/2015 | Wong | G02B 27/017 345/175 |

OTHER PUBLICATIONS

EPO Extended Search Report dated Aug. 1, 2016, for corresponding European Patent Application No. 15194474.1 (20 pages).

* cited by examiner

ELECTRO-OPTICAL DEVICE AND WEARABLE ELECTRONIC DEVICE

CROSS-REFERENCE TO RELATED APPLICATION

This patent application claims priority to and the benefit of Korean Patent Application No. 10-2014-0179575, filed on Dec. 12, 2014, the content of which is hereby incorporated by reference in its entirety.

BACKGROUND

1. Field

Aspects of embodiments of the present invention relate to an electro-optical device and a wearable electronic device.

2. Description of the Related Art

In recent years, various sizes and shapes of mobile electronic devices have been developed. For example, wearable electronic devices, such as smart watches, head-mounted display devices, etc., have been actively developed. In addition, various sizes and shapes of electronic devices have been developed to accommodate varying user preferences.

The above information disclosed in this Background section is only for enhancement of understanding of the background of the invention and therefore it may contain information that does not constitute prior art.

SUMMARY

Aspects of embodiments of the present invention relate to an electro-optical device and a wearable electronic device. More particularly, some aspects of some embodiments of the present invention relate to an electro-optical device capable of providing various data images and obtaining various external images and a wearable electronic device having the electro-optical device.

According to aspects of embodiments of the present invention, an electro-optical device may be capable of providing data images in a plurality of directions and obtaining external images from a plurality of directions using a switchable mirror layer.

According to aspects of embodiments of the present invention, a wearable electronic device may include the electro-optical device.

According to aspects of embodiments of the present invention, an electro-optical device includes: an optical module including a switchable mirror layer configured to operate in a mode selected from a transmissive mode and a reflective mode; a display module configured to generate data images; and a camera module configured to obtain external images, wherein the switchable mirror layer is configured to provide the data images to different directions from each other to correspond to the transmissive mode and the reflective mode.

The switchable mirror layer may be configured to provide the camera module with the external images in the different directions from each other to correspond to the transmissive mode and the reflective mode.

The switchable mirror layer may be configured to provide the data images generated by the display module to a first direction during first periods, to provide the external images in the first direction to the camera module during second periods alternately arranged with the first periods, and to operate in one mode of the transmissive mode and the reflective mode during the first periods and operate in another mode of the transmissive mode and the reflective mode.

Each of the second periods may be shorter than the first periods.

The switchable mirror layer may be configured to provide the data images generated by the display module to a second direction crossing the first direction during the second periods.

The electro-optical device may further include a communication module configured to transmit and receive a wireless signal with an external electronic device.

The optical module may include a first body portion and a second body portion, each of which may include an upper surface, a rear surface, and a plurality of side surfaces connecting the upper surface and the rear surface, the side surfaces may include a first connection surface, a second connection surface, and a diagonal surface, the diagonal surface of the first body portion may face the diagonal surface of the second body portion, and the switchable mirror layer may be arranged on at least one of the diagonal surface of the first body portion and the diagonal surface of the second body portion.

The first connection surface of the first body portion may face the first connection surface of the second body portion in a first direction such that the diagonal surface of the first body portion and the diagonal surface of the second body portion are between the first connection surface of the first body portion and the first connection surface of the second body portion, and the second connection surface of the first body portion may face the second connection surface of the second body portion in a second direction crossing the first direction such that the diagonal surface of the first body portion and the diagonal surface of the second body portion are between the second connection surface of the first body portion and the second connection surface of the second body portion.

The diagonal surface of the first body portion and the diagonal surface of the second body portion may define a predetermined gap.

The switchable mirror layer may include a magnesium-nickel alloy and an oxygen or a hydrogen may be supplied to the gap to correspond to a mode selected from the transmissive mode and the reflective mode.

The display module may face the first connection surface of the first body portion and the camera module may face the second connection surface of the second body portion.

At least one of the second connection surface of the first body portion and the first connection surface of the second body portion may be a concave lens surface or a convex lens surface.

The optical module may further include a lens member coupled to at least one of the second connection surface of the first body portion and the first connection surface of the second body portion and may include either the concave lens surface or the convex lens surface.

The display module may face the first connection surface of the first body portion, the camera module faces the first connection surface of the second body portion, and the optical module may further include a reflective layer facing the second connection surface of the second body portion.

At least one of the second connection surface of the first body portion and the first connection surface of the second body portion may be a concave lens surface or a convex lens surface.

The optical module may further include a lens member coupled to at least one of the second connection surface of the first body portion and the first connection surface of the second body portion and may include either a concave lens surface or a convex lens surface.

The display module may face the first connection surface of the first body portion, the camera module may face the second connection surface of the first body portion, and the optical module may further include a reflective layer facing the first connection surface of the second body portion.

At least one of the second connection surface of the first body portion and the first connection surface of the second body portion may be a concave lens surface or a convex lens surface.

The optical module may further include a lens member coupled to at least one of the second connection surface of the first body portion and the first connection surface of the second body portion and may include either a concave lens surface or a convex lens surface.

According to some example embodiments of the present invention, a wearable electronic device includes: a frame configured to be mounted on a head of a user; and an electro-optical device coupled to the frame to display data images to plural directions and to obtain external images from plural directions, the electro-optical device including: an optical module including a switchable mirror layer configured to operate in a mode selected from a transmissive mode and a reflective mode; a display module configured to generate the data images; and a camera module configured to obtain the external images, wherein the switchable mirror layer is configured to provide a first external image having at least one of information about a focus of eyes of the user and information about a pupil of the user to the camera module when the electro-optical device is set to a first operation position, and the switchable mirror layer is configured to provide a second external image in front of the user to the camera module when the electro-optical device is set to a second operation position.

The switchable mirror layer may be configured to provide a first data image to the eyes of the user when the electro-optical device is set to the first operation position, and the switchable mirror layer may be configured to provide a second data image, which defines an operation of the camera module, to the front of the user when the electro-optical device is set to the second operation position.

According to aspects of embodiments of the present invention, the electro-optical device may display the data images in two different directions according to the operation mode of the switchable mirror layer. In addition, the electro-optical device may capture or take a picture of the external objects from two different directions according to the operation mode of the switchable mirror layer.

The wearable electronic device, according to aspects of embodiments of the present invention, may therefore provide the data images to the user and concurrently (e.g., simultaneously or substantially simultaneously) obtain information about the focus of the user's eyes and information about the pupil. The focus information of the user' eyes and the pupil information may be used to analyze the reaction of the user against the data image. In addition, when the external image in the front of the user is taken, the data images, which define the operation of the camera module, may be provided to a third party.

BRIEF DESCRIPTION OF THE DRAWINGS

The above and other aspects of the present invention will become more readily apparent by reference to the following detailed description when considered in conjunction with the accompanying drawings wherein.

DETAILED DESCRIPTION

Figure 1:
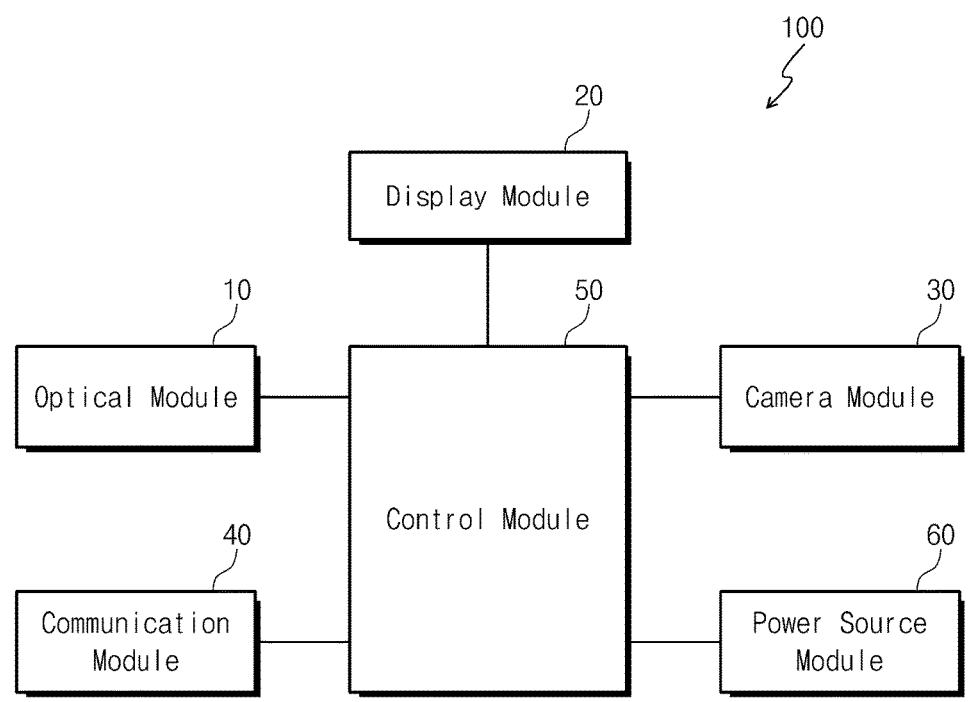
FIG. 1 is a block diagram showing an electro-optical device, according to some example embodiments of the present invention.

It will be understood that when an element or layer is referred to as being "on", "connected to," or "coupled to" another element or layer, it can be directly on, connected to, or coupled to the other element or layer, or intervening elements or layers may be present. In contrast, when an element is referred to as being "directly on," "directly connected to," or "directly coupled to" another element or layer, there are no intervening elements or layers present.

Like numbers refer to like elements throughout. As used herein, the term "and/or" includes any and all combinations of one or more of the associated listed items.

It will be understood that, although the terms first, second, etc. may be used herein to describe various elements, components, regions, layers, and/or sections, these elements, components, regions, layers, and/or sections should not be limited by these terms. These terms are only used to distinguish one element, component, region, layer, and/or section from another element, component, region, layer, or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, aspects of some example embodiments of the present invention will be explained in more detail with reference to the accompanying drawings.

FIG. 1 is a block diagram showing an electro-optical device 100 according to some example embodiments of the present invention.

Referring to FIG. 1, the electro-optical device 100 includes an optical module 10, a display module 20, a camera module 30, a communication module 40, a control module 50, and a power source module 60. The electro-optical device 100 may further include an external charger, a wired/wireless data port, an external interface connected to a card socket (e.g., a memory card, or an SIM/UIM card), and a memory storing image data and sound data.

The optical module 10 includes a switchable mirror layer configured to be operated in a transmissive mode or a reflective mode. The switchable mirror layer has a variable transmittance. The switchable mirror layer transmits a light incident thereto during the transmissive mode and reflects the light incident thereto during the reflective mode. For instance, when the switchable mirror layer reflects about 90% or more of the light incident thereto, the switchable mirror layer is referred to as operating in the reflective mode, but it should not be limited thereto or thereby. That is, the light transmittance of the switchable mirror layer may be changed.

Data images generated by the display module 20 are provided to (e.g., displayed in) a plurality of directions according to the operation of the switchable mirror layer. In addition, the camera module 30 obtains external images from a plurality of directions according to the operation of the switchable mirror layer.

The display module 20 includes a display panel and a control circuit controlling the display panel. The display panel may be any suitable display panel. For example, the display panel may be, but is not limited to, a liquid crystal display panel or an organic light emitting display panel. The camera module 30 includes a lens filter and an image sensor. In addition, the camera module 30 includes a control circuit to control an operation of the image sensor.

The communication module 40 transmits and receives a wireless signal using any suitable wireless communication protocol or configuration, such as a Bluetooth connection or a WiFi connection. The communication module 40 includes a transmitting circuit that modulates a signal to be transmitted and a receiving circuit that demodulates a signal to be received. The communication module 40 includes an external communication module that transmits and receives a wireless signal to another external electronic device and an internal communication module that transmits and receives the wireless signal between internal parts of the electro-optical device 100. For instance, the external communication module includes a Bluetooth module that transmits and receives the wireless signal with a mobile phone or a smart watch and a WiFi module that transmits and receives an inter signal with a wireless router. The internal communication module includes a first short-distance communication circuit installed in the camera module 30 and a second short-distance communication circuit installed in the control module 50. The camera module 30 provides the second short-distance communication circuit connected to the control module 50 with external images through the first short-distance communication circuit. The first and second short-distance communication circuits include a Bluetooth communication circuit or a Zigbee communication circuit. The display module 20 may further include a short-distance communication circuit.

The control module 50 controls an overall operation of the electro-optical device 100. For instance, the control module 50 activates or deactivates the optical module 10, the display module 20, the camera module 30, and the communication module 40. The control module 50 includes at least one microprocessor.

In addition, the control module 50 extracts information about eyes of a user from the obtained external images, such as reaction information of the user against the data images. The control module 50 obtains a position of a crystalline lens with respect to the data images providing plural information to check information among the information, in which the user is mainly interested in, and obtains a size of pupil of the user to check the user's emotion with respect to the data images.

The power source module 60 supplies electric power required to control an overall operation of the electro-optical device 100. The power source module 60 includes a disposable battery or a rechargeable battery, such as a lithium-ion or nickel-cadmium battery.

Figure 2A:
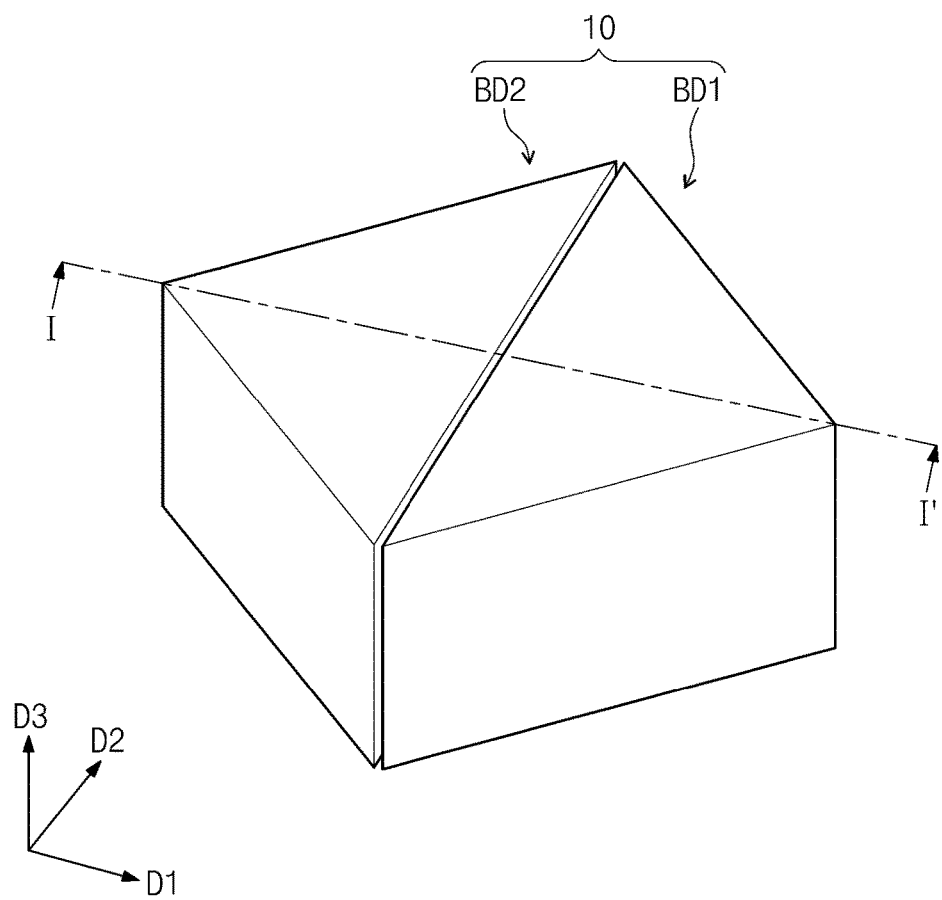
FIG. 2A is a perspective view showing an optical module, according to some example embodiments of the present invention.
Figure 2B:
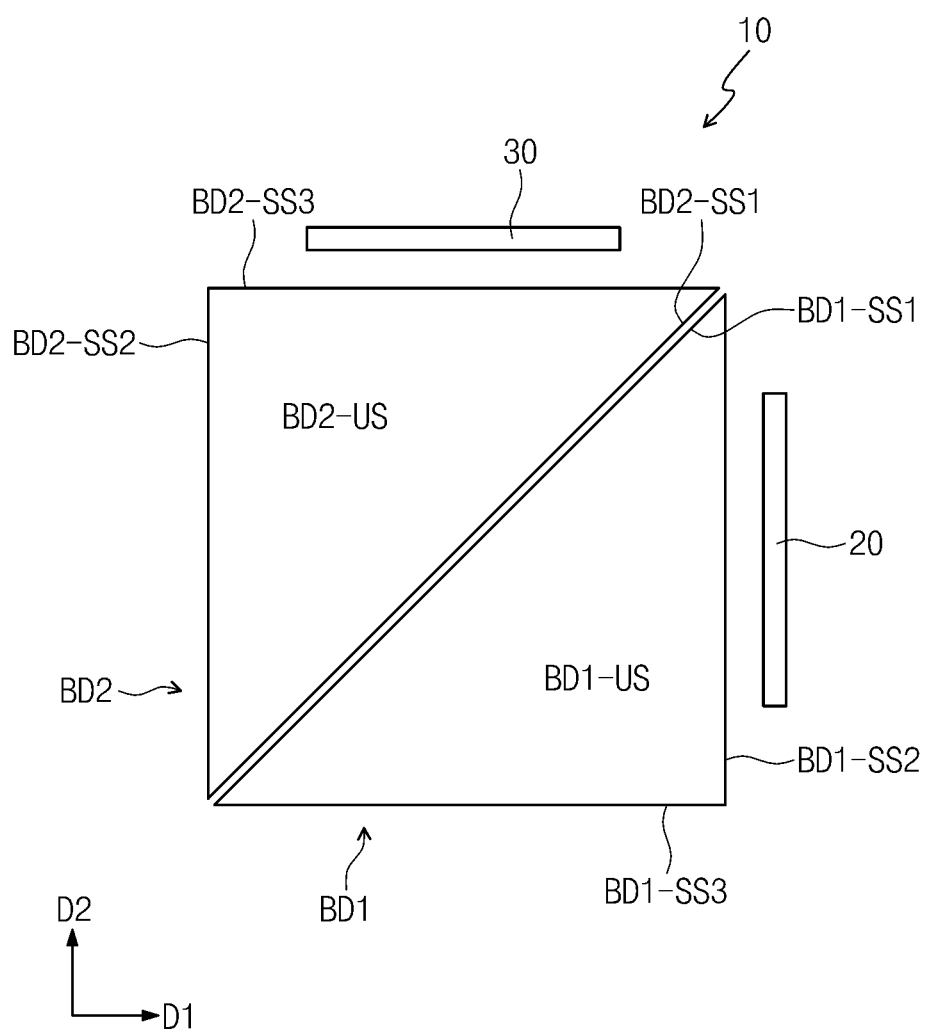
FIG. 2B is a plan view showing the optical module shown in FIG. 2A, according to some example embodiments of the present invention.
Figure 2C:
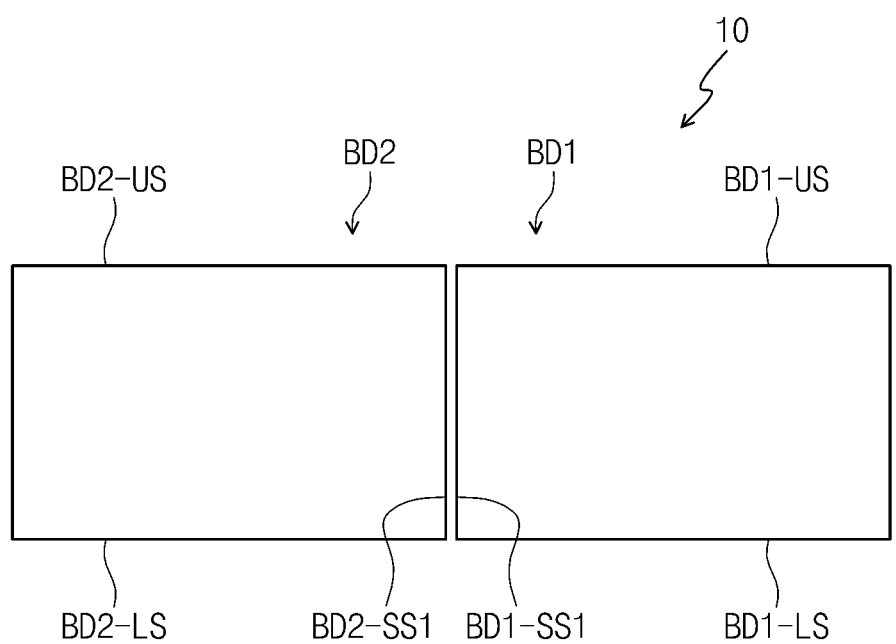
FIG. 2C is a cross-sectional view taken along the line I-I' of FIG. 2A.
Figure 2D:
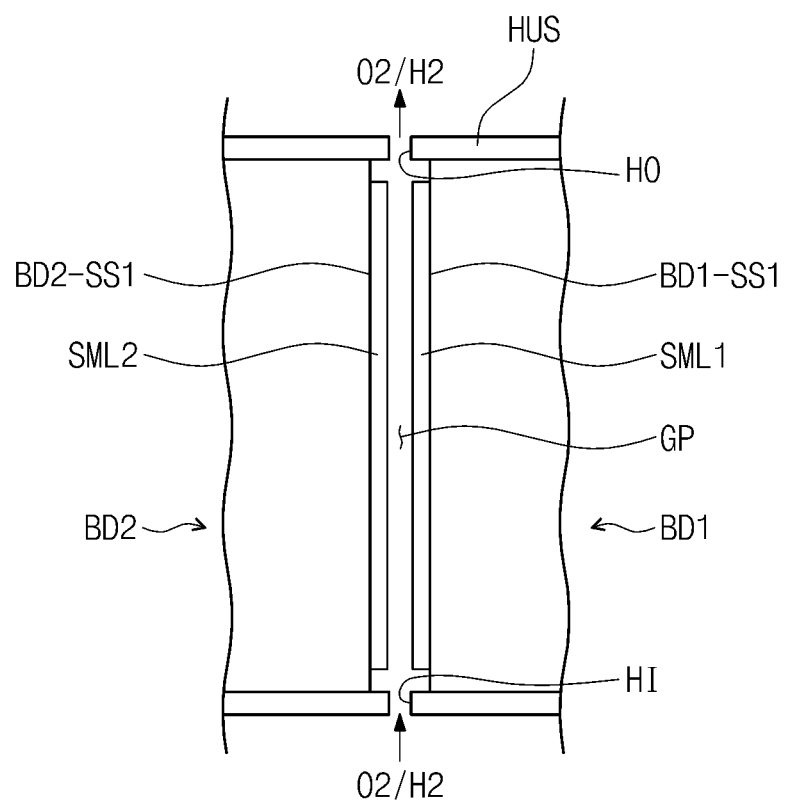
FIG. 2D is an enlarged view showing a portion of the optical module shown in FIG. 2C, according to some example embodiments of the present invention.

FIG. 2A is a perspective view showing the optical module 10 according to an example embodiment of the present disclosure, FIG. 2B is a plan view showing the optical module 10 shown in FIG. 2A, FIG. 2C is a cross-sectional view taken along a line I-I' of FIG. 2A, and FIG. 2D is an enlarged view showing a portion of the optical module shown in FIG. 2C. Hereinafter, a first direction D1 and a second direction D2 perpendicular (or substantially perpendicular) to the first direction D1 define upper and rear surfaces and a third direction D3 perpendicular (or substantially perpendicular) to the first and second directions D1 and D2 indicates a thickness direction of the optical module 10.

Referring to FIGS. 2A to 2D, the optical module 10 includes a first body portion BD1 and a second body portion BD2. Each of the first and second body portions BD1 and BD2 includes a transparent glass or plastic. The first and second body portions BD1 and BD2 are coupled to each other or separated from each other.

The first body portion BD1 includes an upper surface BD1-US, a rear surface BD1-LS, and a plurality of side surfaces BD1-SS1, BD1-SS2, and BD1-SS3 and the second body portion BD2 includes an upper surface BD2-US, a rear surface BD2-LS, and a plurality of side surfaces BD2-SS1, BD2-SS2, and BD2-SS3. In the present example embodiment, each of the first and second body portions BD1 and BD2 have a triangular cylindrical shape (or substantially triangular cylindrical shape) defined by the three side surfaces, but the shape of each of the first and second body portions BD1 and BD2 should not be limited to the triangular cylindrical shape.

The first and second body portions BD1 and BD2 coupled to each other have a square-cylindrical shape (or substantially square-cylindrical shape), but they should not be limited thereto or thereby. That is, the first and second body portions BD1 and BD2 coupled to each other may have a cross-cylindrical shape or a hexagonal cylindrical shape. In addition, the first and second body portions BD1 and BD2 may have different polygonal cylindrical shapes from each other.

Although separately not shown, the communication module 40 and the control module 50 are arranged on the upper surfaces BD1-US and BD2-US or the rear surfaces BD1-LS and BD2-LS of the first and second body portions BD1 and BD2 after being mounted on a circuit board. The power source module 60 is arranged on the upper surfaces BD1-US and BD2-US or the rear surfaces BD1-LS and BD2-LS of the first and second body portions BD1 and BD2. In addition, the electro-optical device may further include a protective frame to accommodate the modules. Positions of the communication module 40, the control module 50, and the power source module 60 may be changed according to a design of the elector-optical device.

Referring to FIG. 2B, the first body portion BD1 includes a diagonal surface BD1-SS1, a first connection surface BD1-SS2, and a second connection surface BD1-SS3. The diagonal surface BD1-SS1 connects the first and second connection surfaces BD1-SS2 and BD1-SS3. The second body portion BD2 includes a diagonal surface BD2-SS1, a first connection surface BD2-SS2, and a second connection surface BD2-SS3. The diagonal surface BD1-SS1 of the first body portion BD1 faces the diagonal surface BD2-SS1 of the second body portion BD2. The switchable mirror layer is arranged or positioned between the diagonal surface BD1-SS1 of the first body portion BD1 and the diagonal surface BD2-SS1 of the second body portion BD2.

The first connection surface BD1-SS2 of the first body portion BD1 faces the first connection surface BD2-SS2 of the second body portion BD2 in the first direction D1 such that the diagonal surface BD1-SS1 of the first body portion BD1 and the diagonal surface BD2-SS1 of the second body portion BD2 are arranged or positioned between the first connection surface BD1-SS2 of the first body portion BD1 and the first connection surface BD2-SS2 of the second body portion BD2. The second connection surface BD1-SS3 of the first body portion BD1 faces the second connection surface BD2-SS3 of the second body portion BD2 in the second direction D2 such that the diagonal surface BD1-SS1 of the first body portion BD1 and the diagonal surface BD2-SS1 of the second body portion BD2 are arranged or positioned between the second connection surface BD1-SS3 of the first body portion BD1 and the second connection surface BD2-SS3 of the second body portion BD2.

The display module 20 faces the first connection surface BD1-SS2 of the first body portion BD1. The camera module 30 faces the second connection surface BD2-SS3 of the second body portion BD2. When the switchable mirror layer is operated in the transmissive mode, a direction in which the data images are displayed by the display module 20 is different from a direction in which the external images are obtained by the camera module 30.

Referring to FIGS. 2C and 2D, a gap (e.g., a predetermined gap) GP exist between the diagonal surface BD1-SS1 of the first body portion BD1 and the diagonal surface BD2-SS1 of the second body portion BD2. A first switchable mirror layer SML1 is arranged or positioned on the diagonal surface BD1-SS1 of the first body portion BD1 and a second switchable mirror layer SML2 is arranged or positioned on the diagonal surface BD2-SS1 of the second body portion BD2. In the present example embodiment, one of the first and second switchable mirror layers SML1 and SML2 may be omitted.

The first and second switchable mirror layers SML1 and SML2 include one of an electrochromic material in which a transmittance thereof is varied depending on current and voltage applied thereto, a thermochromic material in which a transmittance thereof is varied depending on a temperature, and a gasochromic material in which a transmittance thereof is varied depending on a surrounding gas, but the material for the first and second switchable mirror layers SML1 and SML2 should not be limited thereto or thereby.

In the present example embodiment, the first and second switchable mirror layers SML1 and SML2 include a magnesium-nickel alloy as the gasochromic material. The transmittance of the magnesium-nickel alloy may increase by hydrogenation and may decrease by dehydrogenation. The transmittance of the first and second switchable mirror layers SML1 and SML2 may be controlled by the degree of the hydrogenation or dehydrogenation.

Referring to FIG. 2D, the optical module 10 includes a housing HUS to seal the gap GP except for an inlet HI and an outlet HO. The first and second body portions BD1 and BD2 are coupled to or separated from each other by the housing HUS. An oxygen ($O_2$) or a hydrogen ($H_2$) is supplied to the gap GP through the inlet HI and discharged from the gap GP through the outlet HO. When the hydrogen ($H_2$) is supplied to the gap GP, the transmittance of the first and second switchable mirror layers SML1 and SML2 increases, and when the oxygen ($O_2$) is supplied to the gap GP, the transmittance of the first and second switchable mirror layers SML1 and SML2 decreases. The optical module 10 may further include a gas supply member to supply the oxygen (O2) or the hydrogen (H2) to the gap GP.

The optical module including the switchable mirror layer containing the electrochromic material may further include a line to apply the current and voltage to the switchable mirror layer. The line may be positioned or arranged on the body portion. In addition, the optical module including the switchable mirror layer containing the thermochromic material further includes a heat source to supply heat to the switchable mirror layer.

Figure 3A:
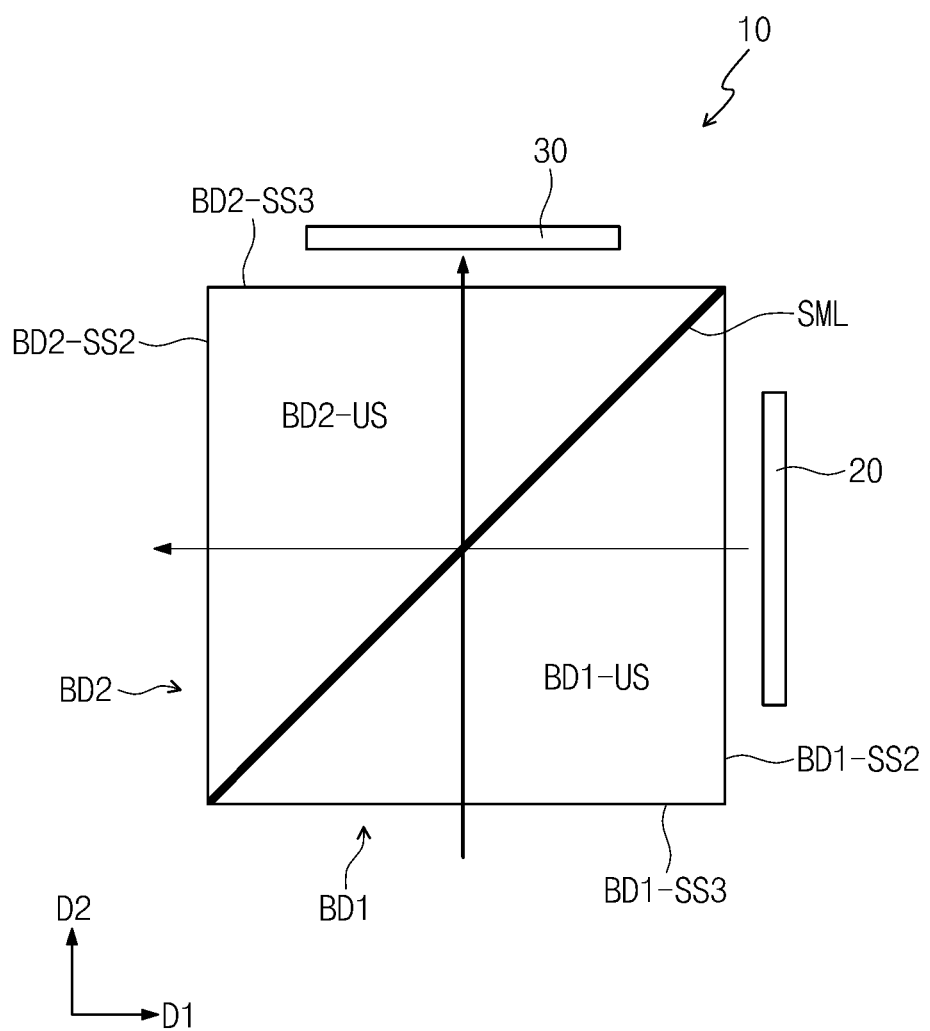
FIG. 3A is a view showing a first operation of an electro-optical device, according to some example embodiments of the present invention.
Figure 3B:
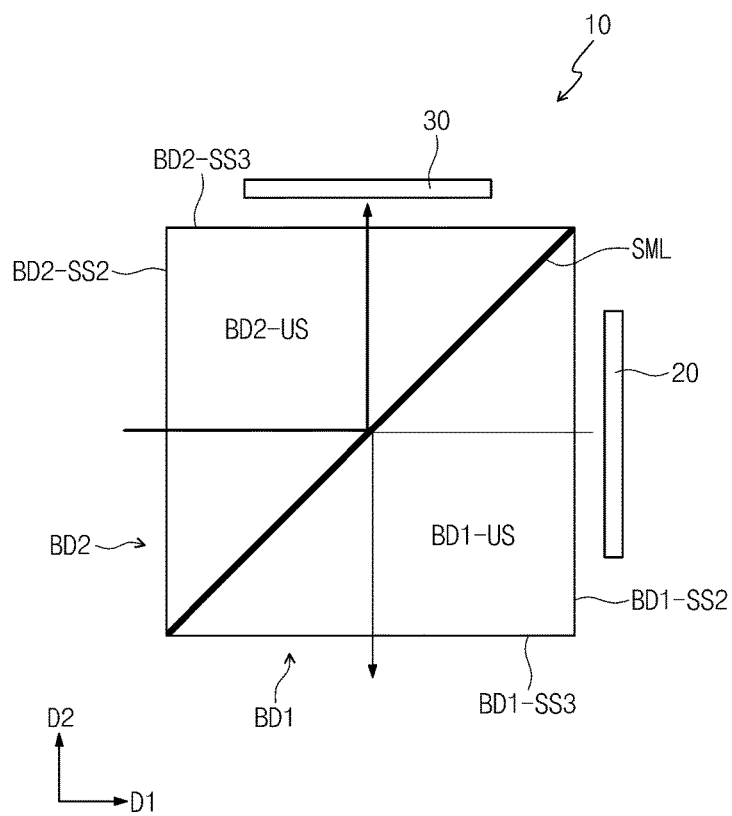
FIG. 3B is a view showing a second operation of an electro-optical device, according to some example embodiments of the present invention.
Figure 3C:
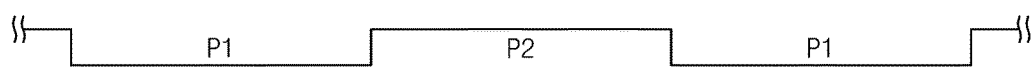
FIG. 3C is a timing diagram showing an operation of a switchable mirror layer for the first and second operations of the electro-optical device, according to some example embodiments of the present invention.

FIG. 3A is a view showing a first operation of an electro-optical device according to an example embodiment of the present disclosure, FIG. 3B is a view showing a second operation of an electro-optical device according to an example embodiment of the present disclosure, and FIG. 3C is a timing diagram showing an operation of a switchable mirror layer for the first and second operations of the electro-optical device according to an example embodiment of the present disclosure.

Hereinafter, the first and second switchable mirror layers SML1 and SML2 shown in FIG. 2D will be referred to as a switchable mirror layer SML. In addition, the diagonal surface BD1-SS1 of the first body portion BD1 and the diagonal surface BD2-SS1 of the second body portion BD2 are not shown.

The switchable mirror layer SML allows the data images generated by the display module 20 to travel to different directions according to the transmissive mode and the reflective mode. In addition, the switchable mirror layer SML provides the camera module 30 with the external images from different directions according to the transmissive mode and the reflective mode. The display module 20 and the camera module 30 are activated in a certain mode of the transmissive mode and the reflective mode.

Referring to FIGS. 3A and 3C, when the switchable mirror layer SML is operated in the transmissive mode during a first period P1 (e.g., when the hydrogen (H2) flows in the gap GP as described with reference to FIG. 2D), the data images generated by the display module 20 are provided to the first direction D1. In addition, when the switchable mirror layer SML is operated in the transmissive mode during the first period P1, the external image is provided to the camera module 30 in the second direction D2. The camera module 30 may take a picture of the external image in the second direction D2 according to the activation thereof.

Referring to FIGS. 3B and 3C, when the switchable mirror layer SML is operated in the reflective mode during a second period P2 (e.g., when the oxygen (O2) flows in the gap GP as described with reference to FIG. 2D), the data images generated by the display module 20 are reflected by the switchable mirror layer SML and provided to the second direction D2. In addition, when the switchable mirror layer SML is operated in the reflective mode during the second period P2, the external image in the first direction D1 is reflected by the switchable mirror layer SML, and then provided to the camera module 30. The camera module 30 may take a picture of the external image in the first direction D1 according to the activation thereof.

Figure 4A:
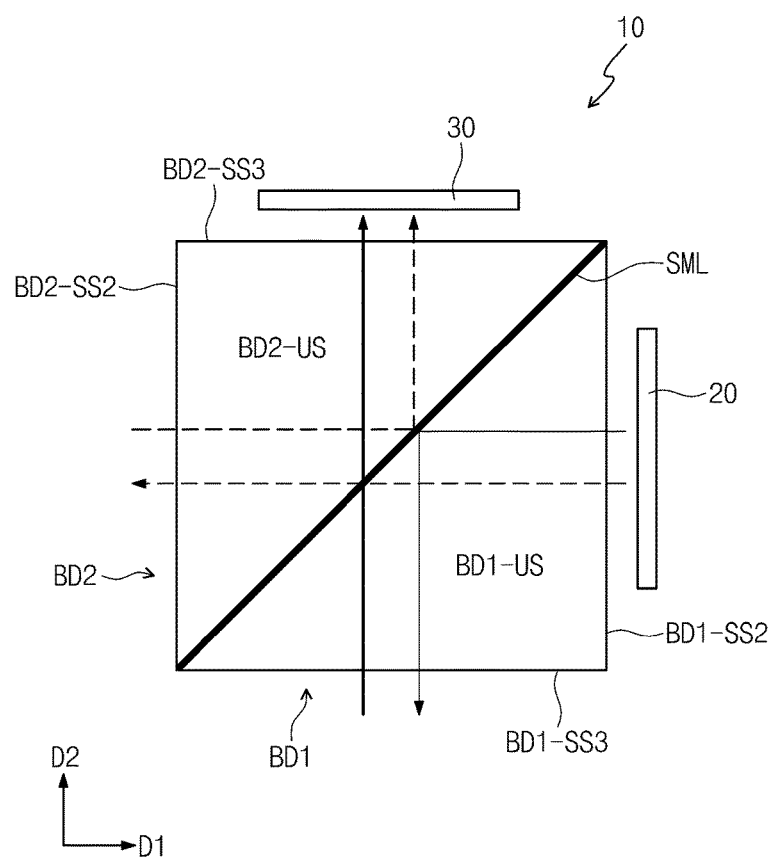
FIG. 4A is a view showing a third operation of an electro-optical device, according to some example embodiments of the present invention.
Figure 4B:
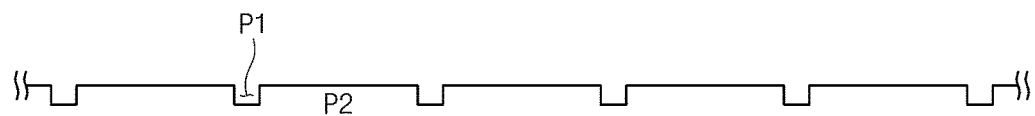
FIG. 4B is a timing diagram showing an operation of a switchable mirror layer for the third operation of the electro-optical device, according to some example embodiments of the present invention.

FIG. 4A is a view showing a third operation of an electro-optical device according to an example embodiment of the present disclosure and FIG. 4B is a timing diagram showing an operation of a switchable mirror layer for the third operation of the electro-optical device according to an example embodiment of the present disclosure.

Referring to FIGS. 4A and 4B, the switchable mirror layer SML is operated in the transmissive mode during first periods P1 and operated in the reflective mode during second periods P2 alternately arranged with the first periods P1. In this case, each of the first periods P1 is shorter than each of the second periods P2. The first periods P1 have the same time length (or substantially the same length, e.g., a few micro second to tens of micro seconds). The second periods P2 have the same time length (or substantially the same length, e.g., a few second to tens of seconds).

The switchable mirror layer SML is operated as a shutter that is operated in the transmissive mode for a short time period. The display module 20 is operated in synchronization with the first periods P1, operated in synchronization with the second periods P2, or continuously displays the data images regardless of the first and second periods P1 and P2.

The display module 20 operated in synchronization with the first periods P1 displays the data images in the shape represented by dotted lines as shown in FIG. 4A. The display module 20 operated in synchronization with the second periods P2 displays the data images in the shape represented by solid lines as shown in FIG. 4A.

In the case that the display module 20 continuously displays the data images regardless of the first and second periods P1 and P2, the data images generated by the display module 20 are displayed in the second direction D2 (e.g., in the solid line shape), because the switchable mirror layer SML is operated in the transmissive mode for the short time period.

The camera module 30 is operated in synchronization with the first periods P1, and thus the camera module 30 takes a picture of the external images in the second direction D2 (e.g., the external images in the solid line shape). The camera module 30 is operated in synchronization with the second periods P2, and thus the camera module 30 takes a picture of the external images in the first direction D1 (e.g., the external images in the dotted-line shape).

In the present example embodiment, the switchable mirror layer SML may be operated in the reflective mode during the first periods P1 and operated in the transmissive mode during the second periods P2 alternately arranged with the first periods P1. When the periods during which the switchable mirror layer SML is operated are changed, the directions to which the data images are displayed may be set.

FIGS. 5A to 5D are plan views showing electro-optical devices according to example embodiments of the present disclosure. In FIGS. 5A to 5D, the same reference numerals denote the same elements in FIGS. 1 to 4B, and thus detailed descriptions of the same elements will be omitted.

Figure 5A:
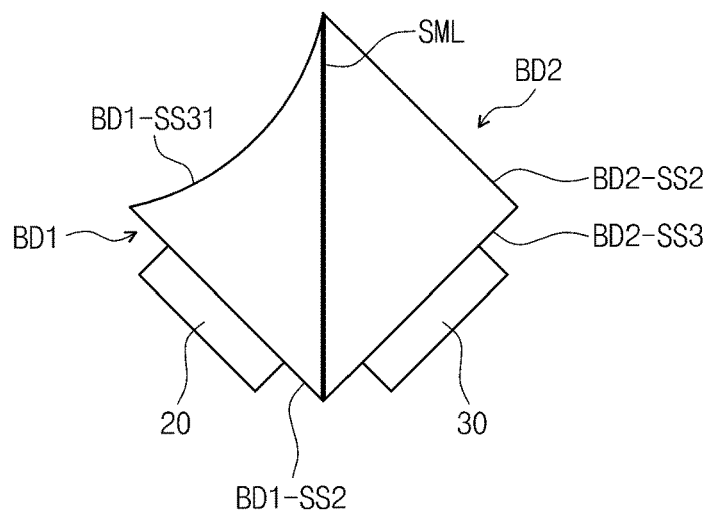
FIGS. 5A to 5D are plan views showing electro-optical devices, according to some example embodiments of the present invention.

Referring to FIG. 5A, a second connection surface BD1-SS31 of a first body portion BD1 may be a concave lens surface. The concave second connection surface BD1-SS31 provides the data images reflected by the switchable mirror layer SML to a focus (e.g., a predetermined focus). In the present example embodiment, a first connection surface BD1-SS2 of a second body portion BD2 may be the concave lens surface. In this case, the data images transmitting through the switchable mirror layer SML may be provided to a focus (e.g., a predetermined focus).

Figure 5B:
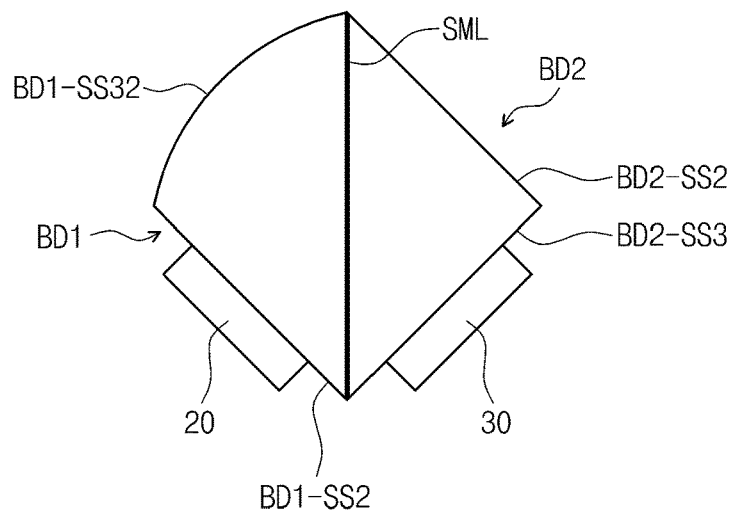

Referring to FIG. 5B, a second connection surface BD1-SS32 of a first body portion BD1 may be a convex lens surface. The convex second connection surface BD1-SS31 may expand the data images reflected by the switchable mirror layer SML. In the present example embodiment, a first connection surface BD1-SS2 of a second body portion BD2 may be the convex lens surface. In this case, the data images transmitting through the switchable mirror layer SML may be expanded.

When the second connection surface BD1-SS32 of the first body portion BD1 is the concave lens surface or the convex lens surface, the first connection surface BD1-SS2 of the second body portion BD2 may be the concave lens surface or the convex lens surface.

Figure 5C:
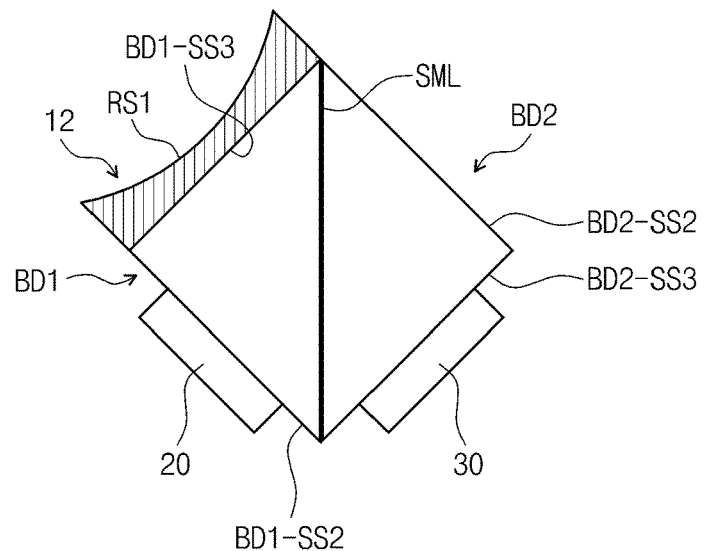
Figure 5D:
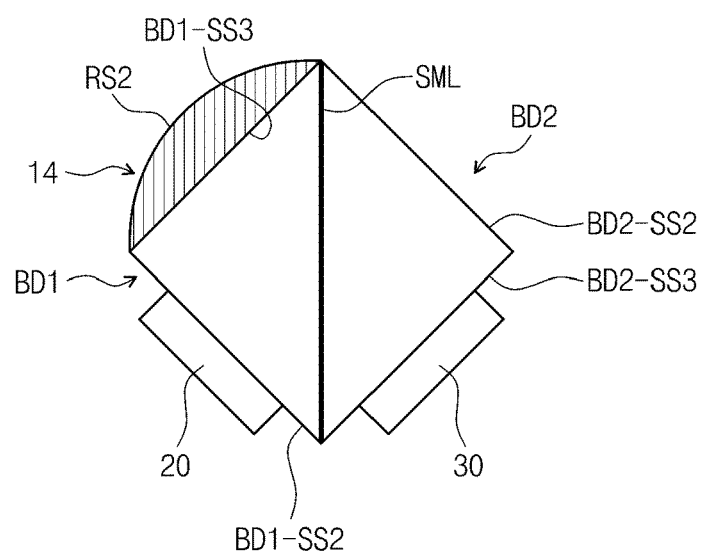

Referring to FIGS. 5C and 5D, the optical module 10 may further include lens members 12 and 14. FIGS. 5C and 5D show one lens member 12 or 14, but the number of the lens members of the optical module 10 should not be limited to one, and the optical module 10 may include a plurality of lens members.

Referring to FIG. 5C, the lens member 12 is arranged or positioned on a second connection surface BD1-SS3 of a first body portion BD1. The lens member 12 includes a concave lens surface RS1. The concave lens surface RS1 provides the data images reflected by the switchable mirror layer SML to a focus (e.g., a predetermined focus). In the present example embodiment, the lens member 12 may be arranged or positioned on the first connection surface BD1-SS2 of the second body portion BD2.

Referring to FIG. 5D, the lens member 14 is arranged or positioned on a second connection surface BD1-SS3 of a first body portion BD1. The lens member 12 includes a convex lens surface RS2. The convex lens surface RS2 may expand the data images from the switchable mirror layer SML. In the present example embodiment, the lens member 14 may be arranged or positioned on the first connection surface BD1-SS2 of the second body portion BD2.

FIGS. 6A to 6D are views showing electronic devices according to example embodiments of the present disclosure. FIGS. 6A to 6D shows wearable electronic devices in which the user wears. Among the wearable electronic devices, a head-mounted display device has been shown in FIGS. 6A to 6D.

The electronic device HMD according to the present example embodiment includes the electro-optical device 100 and a frame 200 worn on the head of the user. The electro-optical device 100 may be the same as that described with reference to FIGS. 1 to 5D, and thus some repetitive detailed descriptions of the electro-optical device 100 will be omitted.

Figure 6A:
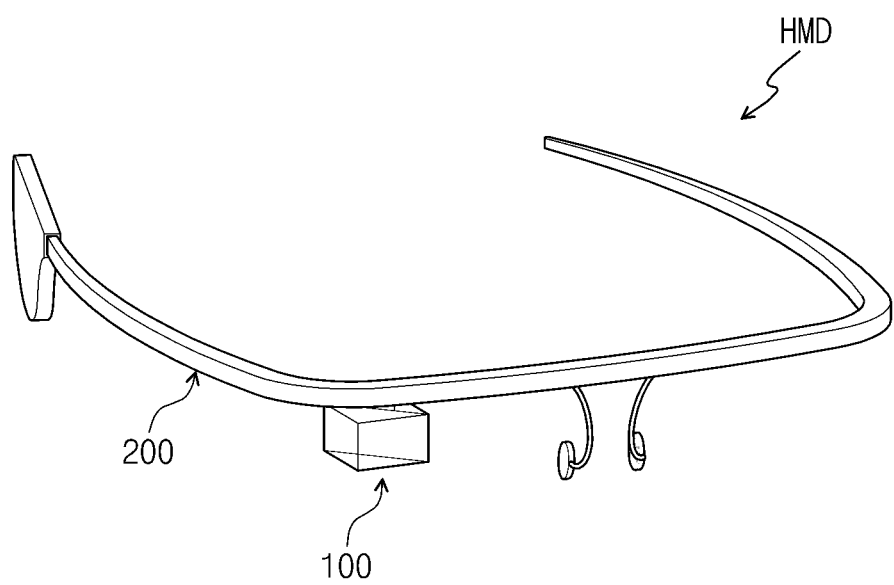
FIGS. 6A to 6D are views showing electronic devices, according to some example embodiments of the present invention.

Referring to FIG. 6A, the electro-optical device 100 is coupled to the frame 200 to display the data images to plural directions and to obtain the external images from plural directions. The electro-optical device 100 is attachable to and detachable from the frame 200. The electro-optical device 100 is not fixed to the frame 200 and is operated to indicate various directions.

A structure required to couple the electro-optical device 100 to the frame 200 should not be limited to a specific structure. For instance, the electronic device HMD may include a hinge structure in order to couple the electro-optical device 100 to the frame 200 such that the electro-optical device HMD is rotated. In addition, the electronic device HMD may include an arm structure with a plurality of joints. Further, a protective frame may be coupled to the frame 200 to cover the electro-optical device 100.

Figure 6B:
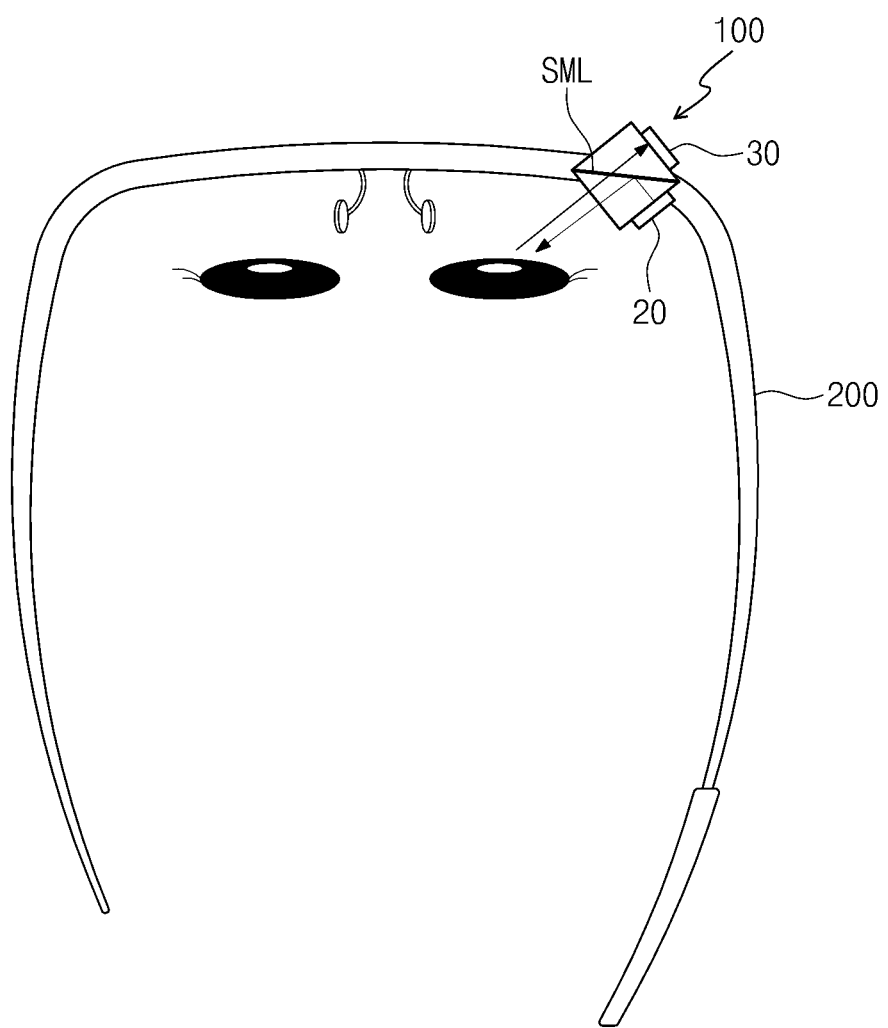
Figure 6C:
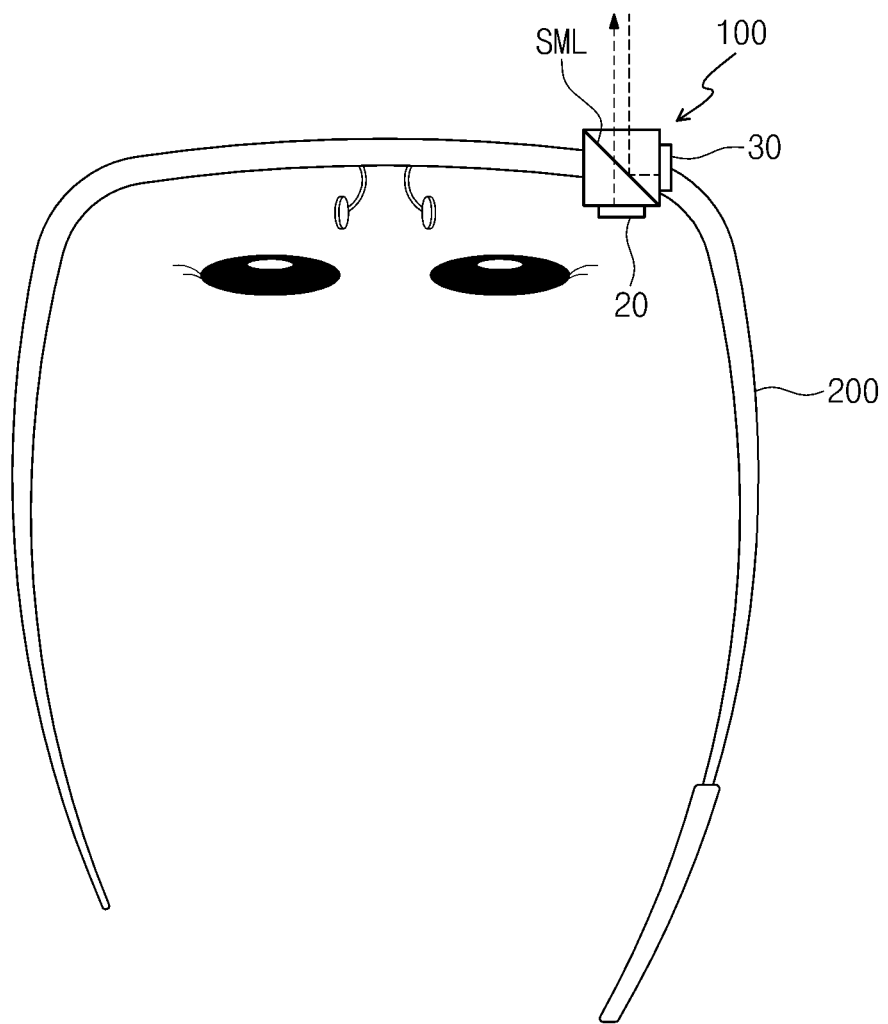

Hereinafter, an operation of the electro-optical device will be described with reference to FIGS. 6B and 6C. FIGS. 6B and 6C show the electro-optical device 100 rotated to indicate different directions. The electro-optical device 100 is operated as same as the operation described with reference to FIGS. 4A and 4B.

Referring to FIG. 6B, when the electro-optical device 100 is set to a first operation position, the switchable mirror layer SML provides the camera module 30 with a first external image having at least one of information about focus of the user's eyes or information about pupil. In this case, the switchable mirror layer SML provides the user's eyes with a first data image. The first data image is the image selected by the user.

When the switchable mirror layer SML is operated in the reflective mode, the display module 20 provides the user with the first data image, and when the switchable mirror layer SML is operated in the transmissive mode, the camera module 30 obtains the first external image. The focus information and the pupil information, which are obtained from the first external image, may be used to analyze the reaction of the user against the data images.

Referring to FIG. 6C, when the electro-optical device 100 is set to a second operation position, the switchable mirror layer SML provides the camera module 30 with a second external image in the front of the user. In this case, the switchable mirror layer MSL provides a second data image to the front of the user, which defines the operation of the camera module 30. The second data image may warn a third party that the camera module 30 is under operation when the external image in the front of the user is taken.

When the switchable mirror layer SML is operated in the reflective mode, the camera module 30 obtains the second external image, and when the switchable mirror layer SML is operated in the transmissive mode, the display module 20 provides the third party with the second data image.

Figure 6D:
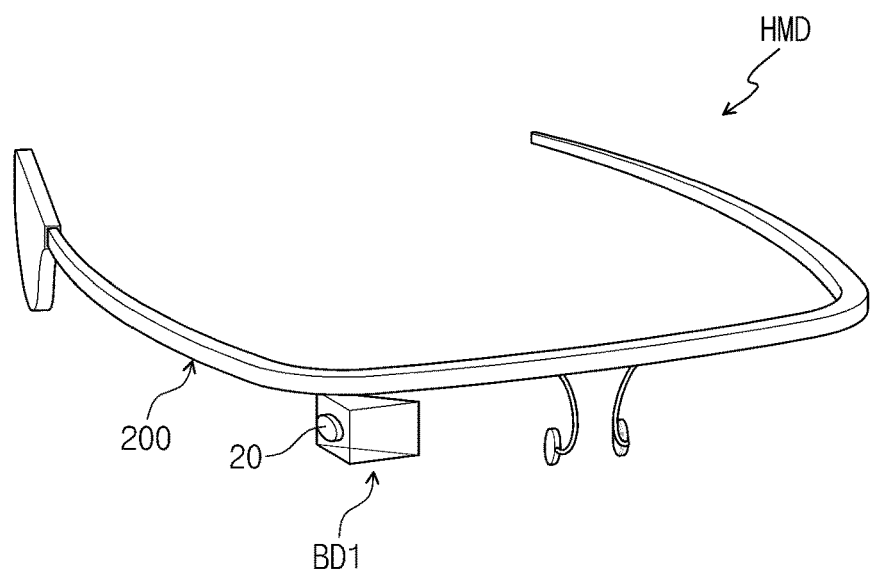
Figure 6D:
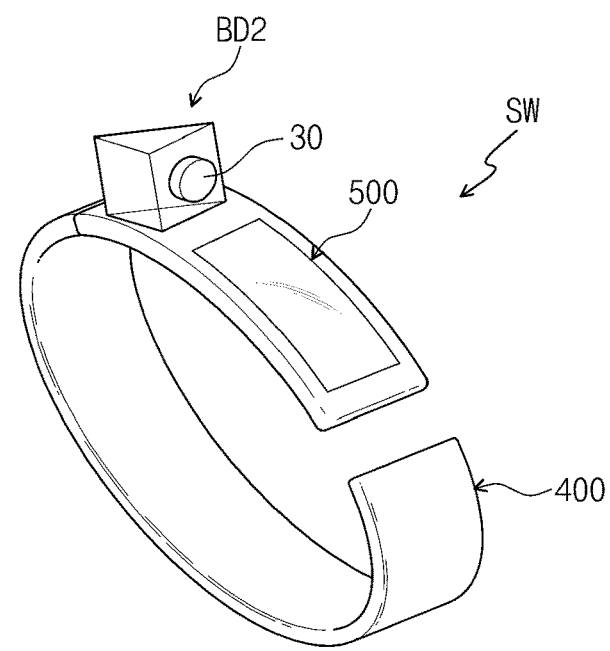

Referring to FIG. 6D, portions of the electro-optical device 100 may be separated from the electro-optical device 100. The first and second body portions BD1 and BD2 (refer, e.g., to FIGS. 2A to 2D) of the optical module 10 may be separated from the electro-optical device 100. In this case, the camera module 30 may be separated together with the second body portion BD2. To this end, the first switchable mirror layer SML1 (refer, e.g., to FIG. 2D) of the first body portion BD1 and the second switchable mirror layer SML2 (refer, e.g., to FIG. 2D) of the second body portion BD2 have only a function of the reflective surface.

The separated portions from the electro-optical device 100 are coupled to different wearable electronic devices from each other. FIG. 6D shows the camera module 30 and the second body portion BD2, which are coupled to a smart watch SW. The camera module 30 receives a source voltage from the smart watch and the external image taken by the camera module 30 is provided to the control module 50 of the electro-optical device 100 through a wireless communication system after being provided to the smart watch.

Figure 7:
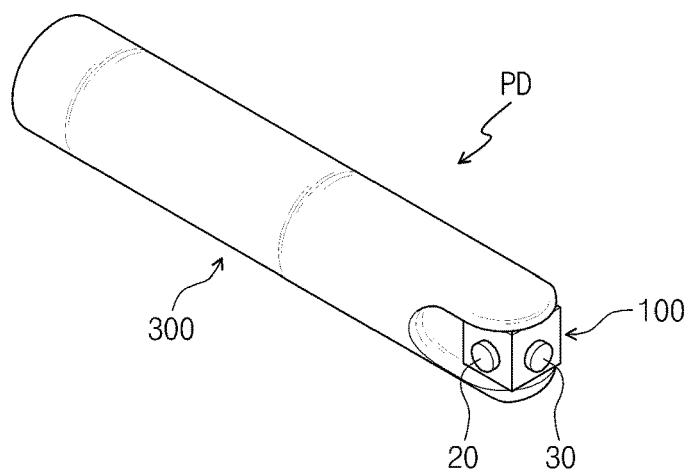
FIGS. 7 and 8 are views showing electronic devices, according to some example embodiments of the present invention.
Figure 8:
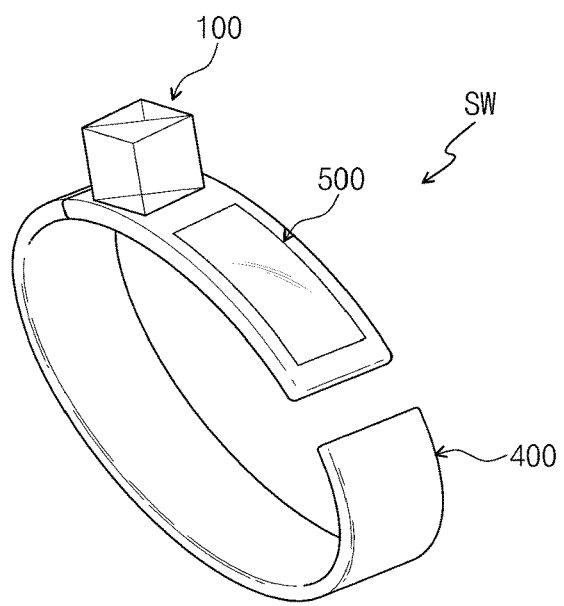

FIGS. 7 and 8 are views showing electronic devices according to example embodiments of the present disclosure. FIG. 7 shows an electronic device PD having a function of pointer and projector and FIG. 8 shows a smart watch SW.

Referring to FIG. 7, the electronic device PD having the pointer/projector function includes an electro-optical device 100 and a frame 300. The electro-optical device 100 is coupled to the frame 300 to display the data images to plural directions and to obtain the external images from plural directions. The electro-optical device 100 is attachable to and detachable from the frame 300. The electro-optical device 100 is operated to indicate various directions while being coupled to the frame 300.

The electro-optical device 100 provides a point image or an enlarged projector image to a predetermined focus according to the operated position thereof. The electro-optical device 100 obtains the external images from various directions according to the operated position thereof.

Referring to FIG. 8, the smart watch SW includes an electro-optical device 100, a frame 400, and a display module 500. The smart watch SW may further include an input button and a control module to control an overall function of an electronic device. The electro-optical device 100 is attachable to or detachable from the frame 400. The frame 400 has a substantially band shape with a predetermined curvature. The display module 500 displays various informations corresponding to functions of the smart watch SW.

Figure 9A:
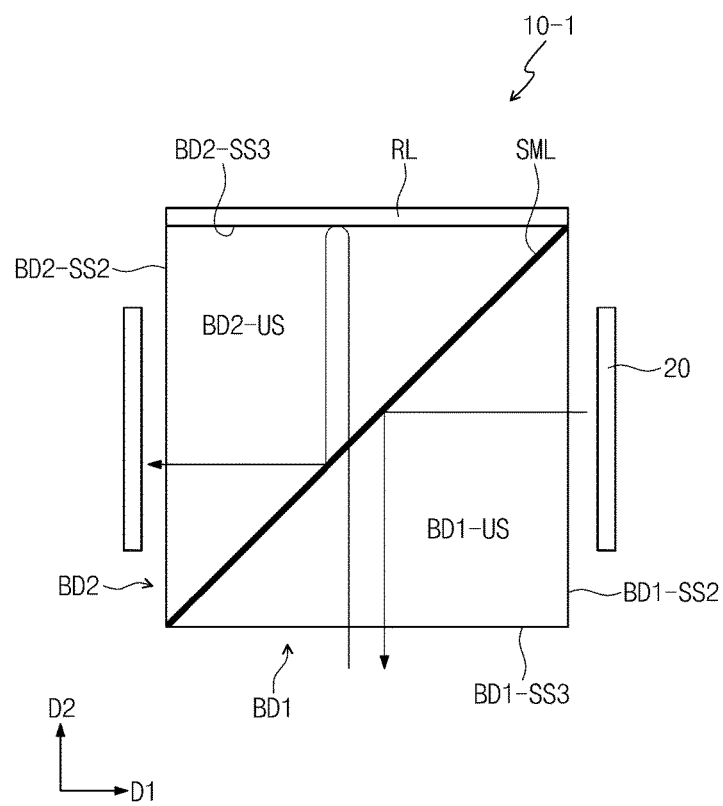
FIG. 9A is a view showing a first operation of an electro-optical device, according to some example embodiments of the present invention.
Figure 9B:
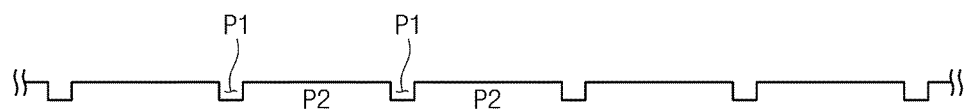
FIG. 9B is a timing diagram showing an operation of a switchable mirror layer for the first operation of the electro-optical device, according to some example embodiments of the present invention.

FIG. 9A is a view showing a first operation of an electro-optical device 10-1 according to an example embodiment of the present disclosure and FIG. 9B is a timing diagram showing an operation of a switchable mirror layer for the first operation of the electro-optical device according to an example embodiment of the present disclosure. In FIGS. 9A and 9B, the same reference numerals denote the same elements in FIGS. 1 to 5D, and thus some repetitive detailed descriptions of the same elements will be omitted. The electro-optical device shown in FIGS. 9A and 9B may be applied to the electronic devices described with reference to FIGS. 6A to 8.

Referring to FIG. 9A, a display module 20 faces a first connection surface BD1-SS2 of a first body portion BD1. A camera module 30 faces a first connection surface BD2-SS2 of a second body portion BD2. An optical module 10-1 further includes a reflective layer RL facing a second connection surface BD2-SS3 of the second body portion BD2.

In the present example embodiment, a second connection surface BD1-SS3 of the first body portion BD1 may be a lens surface. In addition, the optical module 10-1 may further include a lens member having a lens surface.

Referring to FIGS. 9A and 9B, the switchable mirror layer SML is operated in the transmissive mode during first periods P1 and operated in the reflective mode during second periods P2 alternately arranged with the first periods P1. The first periods P1 have the same time length, e.g., a few micro second to tens of micro seconds. The second periods P2 have the same time length (e.g., a few second to tens of seconds).

When the display module 20 displays the data images in synchronization with the second periods P2, the switchable mirror layer SML reflects the data images to the second direction D2. The external images in the second direction D2, which transmit through the switchable mirror layer SML during the first periods P1, are incident to the reflective layer RL. The external images in the second direction D2, which are reflected by the reflective layer RL during the second periods P2, are re-reflected by the switchable mirror layer SML and incident to the camera module 30. The camera module 30 takes a picture of the external images in the second direction D2 during the second periods P2.

The camera module 30 is activated during the second periods P2, particularly, during a period changed from the first periods P1 to the second periods P2. The camera module 30 may be activated during the first and second periods P1 and P2 and obtain the data images overlapped with the external images in the second direction D2.

Figure 10A:
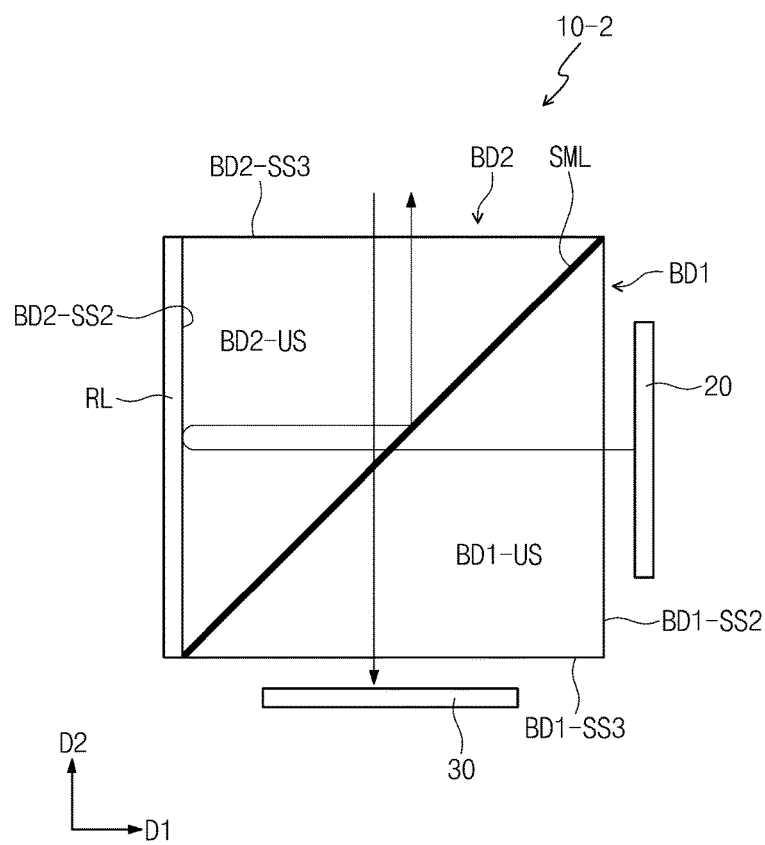
FIG. 10A is a view showing a first operation of an electro-optical device, according to some example embodiments of the present invention.
Figure 10B:
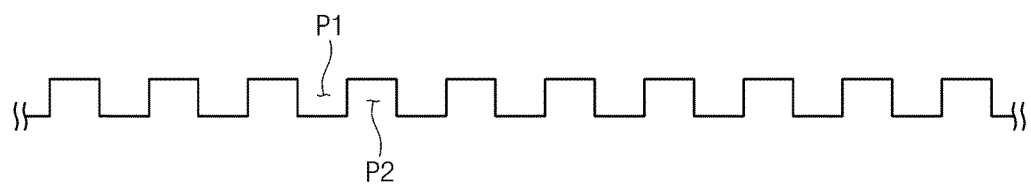
FIG. 10B is a timing diagram showing an operation of a switchable mirror layer for the first operation of the electro-optical device, according to some example embodiments of the present invention.

FIG. 10A is a view showing a first operation of an electro-optical device according to an example embodiment of the present disclosure and FIG. 10B is a timing diagram showing an operation of a switchable mirror layer for the first operation of the electro-optical device according to an example embodiment of the present disclosure. In FIGS. 10A and 10B, the same reference numerals denote the same elements in FIGS. 1 to 5D, and thus some repetitive detailed descriptions of the same elements will be omitted. The electro-optical device shown in FIGS. 9A and 9B may be applied to the electronic devices described with reference to FIGS. 6A to 8.

Referring to FIG. 10A, a display module 20 faces a first connection surface BD1-SS2 of a first body portion BD1. A camera module 30 faces a second connection surface BD1-SS3 of the first body portion BD1. An optical module 10-2 further includes a reflective layer RL facing a first connection surface BD2-SS2 of the second body portion BD2.

In the present example embodiment, a second connection surface BD2-SS3 of the second body portion BD2 may be a lens surface. In addition, the optical module 10-2 may further include a lens member having a lens surface.

Referring to FIGS. 10A and 10B, the switchable mirror layer SML is operated in the transmissive mode during first periods P1 and operated in the reflective mode during second periods P2 alternately arranged with the first periods P1. The first and second periods P1 and P2 have the same time length (e.g., a few micro second to tens of micro seconds).

The data images displayed by the display module 20 in synchronization with the first periods P1 transmit through the switchable mirror layer SML. The data images reflected by the reflective layer RL during the second periods P2 are provided to the second direction D2 after being re-reflected by the switchable mirror layer SML.

The camera module 30 is activated during the first periods P1. The camera module 30 takes a picture of the external images in the second direction D2. The camera module 30 may be activated during the first and second periods P1 and P2 and obtain the data images overlapped with the external images in the second direction D2.

Although the example embodiments of the present invention have been described, it is understood that the present invention should not be limited to these example embodiments but various changes and modifications can be made by one ordinary skilled in the art within the spirit and scope of the present invention as hereinafter claimed in the following claims, and their equivalents.

What is claimed is:

1. An electro-optical device comprising:
    an optical module comprising a first body portion, a second body portion, and a switchable mirror layer arranged between the first body portion and the second body portion, the switchable mirror layer configured to operate in a mode selected from a transmissive mode and a reflective mode;
    a display module configured to generate data images; and
    a camera module configured to obtain external images,
    wherein the switchable mirror layer is arranged between the display module and the camera module such that the switchable mirror layer is configured to provide the data images generated by the display module, and the external images, to different directions from each other to correspond to the transmissive mode and the reflective mode.

2. The electro-optical device of claim 1, further comprising a communication module configured to transmit and receive a wireless signal with an external electronic device.

3. The electro-optical device of claim 1, wherein the switchable mirror layer is configured to provide the camera module with the external images in the different directions from each other to correspond to the transmissive mode and the reflective mode.

4. The electro-optical device of claim 3, wherein the switchable mirror layer is configured to provide the data images generated by the display module to a first direction during first periods, to provide the external images in the first direction to the camera module during second periods alternately arranged with the first periods, and to operate in one mode of the transmissive mode and the reflective mode during the first periods and operate in another mode of the transmissive mode and the reflective mode.

5. The electro-optical device of claim 4, wherein each of the second periods is shorter than the first periods.

6. The electro-optical device of claim 4, wherein the switchable mirror layer is configured to provide the data images generated by the display module to a second direction crossing the first direction during the second periods.

7. The electro-optical device of claim 1, wherein each of the first body portion and the second body portion comprises an upper surface, a rear surface, and a plurality of side surfaces connecting the upper surface and the rear surface, the side surfaces comprise a first connection surface, a second connection surface, and a diagonal surface, the diagonal surface of the first body portion faces the diagonal surface of the second body portion, and the switchable mirror layer is arranged on at least one of the diagonal surface of the first body portion and the diagonal surface of the second body portion.

8. The electro-optical device of claim 7, wherein the first connection surface of the first body portion faces the first connection surface of the second body portion in a first direction such that the diagonal surface of the first body portion and the diagonal surface of the second body portion are between the first connection surface of the first body portion and the first connection surface of the second body portion, and the second connection surface of the first body portion faces the second connection surface of the second body portion in a second direction crossing the first direction such that the diagonal surface of the first body portion and the diagonal surface of the second body portion are between the second connection surface of the first body portion and the second connection surface of the second body portion.

9. The electro-optical device of claim 8, wherein the diagonal surface of the first body portion and the diagonal surface of the second body portion define a predetermined gap.

10. The electro-optical device of claim 9, wherein the switchable mirror layer comprises a magnesium-nickel alloy and an oxygen or a hydrogen is supplied to the gap to correspond to a mode selected from the transmissive mode and the reflective mode.

11. The electro-optical device of claim 8, wherein the display module faces the first connection surface of the first body portion and the camera module faces the second connection surface of the second body portion.

12. The electro-optical device of claim 11, wherein at least one of the second connection surface of the first body portion and the first connection surface of the second body portion is a concave lens surface or a convex lens surface.

13. The electro-optical device of claim 12, wherein the optical module further comprises a lens member coupled to at least one of the second connection surface of the first body portion and the first connection surface of the second body portion and comprising either the concave lens surface or the convex lens surface.

14. The electro-optical device of claim 8, wherein the display module faces the first connection surface of the first body portion, the camera module faces the first connection surface of the second body portion, and the optical module further comprises a reflective layer facing the second connection surface of the second body portion.

15. The electro-optical device of claim 14, wherein at least one of the second connection surface of the first body portion and the first connection surface of the second body portion is a concave lens surface or a convex lens surface.

16. The electro-optical device of claim 14, wherein the optical module further comprises a lens member coupled to at least one of the second connection surface of the first body portion and the first connection surface of the second body portion and comprising either a concave lens surface or a convex lens surface.

17. The electro-optical device of claim 8, wherein the display module faces the first connection surface of the first body portion, the camera module faces the second connection surface of the first body portion, and the optical module further comprises a reflective layer facing the first connection surface of the second body portion.

18. The electro-optical device of claim 17, wherein at least one of the second connection surface of the first body portion and the first connection surface of the second body portion is a concave lens surface or a convex lens surface.

19. The electro-optical device of claim 17, wherein the optical module further comprises a lens member coupled to at least one of the second connection surface of the first body portion and the first connection surface of the second body portion and comprising either a concave lens surface or a convex lens surface.

20. A wearable electronic device comprising:
a frame configured to be mounted on a head of a user; and
an electro-optical device coupled to the frame to display data images to plural directions and to obtain external images from plural directions, the electro-optical device comprising:
an optical module comprising a switchable mirror layer configured to operate in a mode selected from a transmissive mode and a reflective mode;
a display module configured to generate the data images; and
a camera module configured to obtain the external images, wherein the switchable mirror layer is configured to provide a first external image having at least one of information about a focus of eyes of the user and information about a pupil of the user to the camera module when the electro-optical device is set to a first operation position, and the switchable mirror layer is configured to provide a second external image in front of the user to the camera module when the electro-optical device is set to a second operation position.

21. The wearable electronic device of claim 20, wherein the switchable mirror layer is configured to provide a first data image to the eyes of the user when the electro-optical device is set to the first operation position, and the switchable mirror layer is configured to provide a second data image, which defines an operation of the camera module, to the front of the user when the electro-optical device is set to the second operation position.

* * * * *